Inventor Fukuo Shibata

Inventor Fukuo Shibata

Inventor Fukuo Shibata

United States Patent Office 3,441,822
Patented Apr. 29, 1969

3,441,822
ELECTRIC CONTROL SYSTEMS FOR WOUND
ROTOR TYPE INDUCTION MACHINES
Fukuo Shibata, No. 13, Tokiwa-cho, Nishinomiya,
Hyogo Prefecture, Japan
Filed Sept. 23, 1964, Ser. No. 398,539
Claims priority, application Japan, Sept. 30, 1963,
38/52,875
Int. Cl. H02k 17/24, 3/18, 1/26
U.S. Cl. 318—197      10 Claims

ABSTRACT OF THE DISCLOSURE

An electric control system for a wound rotor type induction machine can be obtained by an arrangement in which there are at least two direct current machines, and a first direct current machine whose rotor is coupled with the said induction machine is connected electrically in series with a second direct current commutating machine whose rotor is mechanically coupled with a rotor or a rotating shaft of another rotating machine than the said induction machine to a direct current terminals of a converter whose A.C. terminals are connected with secondary output terminals of the induction machine.

---

This invention relates to electric machine control systems, and it has particular relation to systems for controlling wound rotor type induction machines by auxiliary direct current commutating machines.

In this invention, it is defined that a wound rotor type induction machine is an induction machine in which the secondary circuit consists of poly-phase winding or coils whose terminals are either short circuited or closed through suitable circuits. An induction machine is an asynchronous machine which comprises a magnetic circuit interlinked with an electric circuit, rotating with respect to each other and in which power is transferred by electromagnetic induction. In this invention, examples of induction machines are induction generators, induction motors and electric couplings which are devices for transmitting torque by means of electromagnetic force in which there is no mechanical torque contact between the driving and driven members. The slip type electric coupling has poles excited by direct current on one rotating member, and an armature winding on the other rotating member.

In this invention, it is also defined that a direct current commutating machine comprises a magnetic field excited from a direct current source or formed of permanent magnets, an armature and a commutator connected therewith. Specific types of direct current commutating machines are: direct current generators and motors.

In arrangements of this invention, the secondary output terminals of wound rotor induction machines are electrically connected to commutators of direct current commutating machines through converters. In this invention, it is defined that a converter is a device used to change alternating current power to direct current power. Therefore, static converters and rotary converters are examples of converters. And examples of static converters are units which employ static switching or rectifying device such as semiconductor or metalic rectifiers with or without control elements, mercury arc rectifiers, electron tubes or magnetic amplifiers.

In the control of induction machines by auxiliary direct current commutating machines, it is important to provide control systems by which the induction machines can be controlled over wide speed ranges without sacrificing efficiency of operation, and economy of apparatus of the systems.

Heretofore, various arrangements have been devised which permit the control of induction machines by employing converters or rectifiers and auxiliary direct current commutating machines which are electrically connected with the secondary windings of the main induction machines and whose rotors are "mechanically coupled" to those of the main induction machines. In this specification, it is defined that the words "to couple mechanically" is to connect the objects so that the mechanical torque or power can be transferred between the objects by mechanical torque contact touching, for instance, with direct coupler (with bolt, pin etc.), with rubber, with belt, with gear, with chain, with magnetic clutch, with torque converter.

In general, these above arrangements are called Kramer Systems. Some of these arrangements accomplish the desired speed control, but have necessitated the use of auxiliary machines and apparatus of inordinate proportions relative to the sizes and ratings of the induction machines to be controlled. Therefore, these arrangements become expensive. In addition, in each arrangement of these prior methods, it is necessary to reduce the voltage of the auxiliary direct current machine by adjusting the shunt field excitation, if the wound rotor induction machine is required to be controlled in a range of high speed near the synchronous speed. Accordingly in these cases, the result is that the available torque or the available output of the auxiliary direct current machine is reduced when controlled in a high speed range, and the available torque or output of the total machines is reduced. In the control of an induction machine of Kramer System by an auxiliary direct current commutating machine, it is very important to provide a control system by which the induction machine can be controlled utilizing efficiently the available torque or output of the auxiliary direct current commutating machine.

The principal object of my invention is to provide control methods or systems for a wound rotor induction machine which shall be very simple and efficient in operation and which may be readily and economically manufactured and installed, by using an auxiliary direct current commutating machine which is electrically connected with the secondary winding of the main induction machine and whose rotor is mechanically coupled to that of the main induction machine.

The most important object of my invention is to provide control methods of systems in which the main induction machine can be controlled over a wide range while the total torque or output combined of the main induction machine with the auxiliary direct current commutating machine is being kept high by using efficiently the available torque or output of the auxiliary direct current commutating machine.

Another important object of my invention is to provide a control system by which many wound rotor induction machines coupled with direct current commutating machines can be controlled to have speeds different from each other by using other direct current commutating machines in common.

Still another important object of my invention is to provide a control system by which a wound rotor induction machine can be controlled as a generator.

A further object of my invention is to provide a control system by which speed of a wound rotor induction machine can be finely controlled as an element of an automatic speed control device.

Other objects of my invention will in part be obvious and in part appear hereinafter.

Accordingly, my invention is disclosed in the embodiments thereof shown in the accompanying drawings and comprises the features of construction, combination of elements and arrangement of parts which will be exemplified in the constructions hereinafter set forth and the scope of which will be defined in the appended claims.

For a more complete understanding of the nature and scope of my invention, reference may be had to the following detailed description, taken in connection with the accompanying drawings, in which.

In my invention, secondary output terminals of a wound rotor type induction machine are connected, through a converter, to commutators of direct current commutating machines. There are, at least, two direct current commutating machines: the first direct current commutating machine and the second direct current commutating machine. A terminal for the armature circuit of the first direct current commutating machine is electrically connected to the secondary output terminals of the said induction machine through the said converter, and the rotor of the first direct current commutating machine is mechanically coupled to the wound rotor of the said induction machine. A terminal for the armature circuit of the second direct current commutating machine is electrically connected to the secondary output terminals of the said induction machine through the said converter, and the rotor of the second direct current commutating machine is mechanically coupled to the rotor of another rotating machine than the said wound rotor of the induction machine.

In this invention, there are electric connections between the said converter and the said direct current commutating machines whose commutator circuits are electrically in series with each other to direct current terminals of the said converter so that electric power can be transferred between the said first direct current commutating machine and the second direct current commutating machine. One of the most important points in this invention is that there are control means of field excitation and terminal voltage of the said direct current commutating machines by which electric power can be transferred between the first direct current commutating machine and the second direct current commutating machine.

In the above words, "transfer" means that electric power is supplied either from the first direct current commutating machine to the second direct current commutating machine or from the second direct current commutating machine to the first direct current commutating machine.

Figure 1:
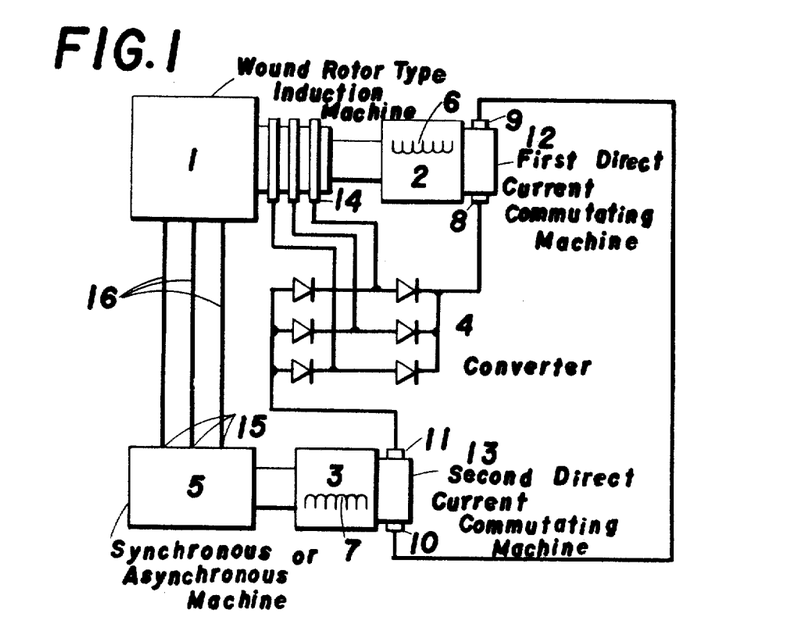
FIG. 1 illustrates diagrammatically one embodiment of my invention.

In FIG. 1, secondary output terminals 14 of a wound rotor type induction machine 1 are connected, through a converter 4, to terminals or brushes 8 and 11 of commutators 12 and 13 of direct current commutating machines 2 and 3. Terminals or brushes 9 and 10 of commutators 12 and 13 are connected with each other.

A rotor of the first direct current commutating machine 2 is mechanically coupled to the wound rotor of the main induction machine 1, and a rotor of the second direct current commutating machine 3 is mechanically coupled to a rotor of a synchronous or an asynchronous generator 5. Output terminals 15 of the synchronous or asynchronous machine 5 are connected to three phase A.C. bus 16, so that A.C. power can be transferred between the machine 5 and the A.C. bus 16.

If the motor-generator 3–5 is excluded from the arrangement of FIG. 1, the system becomes the Kramer which consists of the wound rotor induction machine 1, the first direct current commutating machine 2 and the converter or rectifier 4. The characteristic obtained by such an arrangement of Kramer becomes AB in FIG. 10, where abscissa shows revolution per minute of wound rotor induction machines, and ordinate shows the available output power of the motor or combined motors. The available output power of the wound rotor induction machine 1 in such Kramer system is shown as AF in FIG. 10, and the available output power of the first direct current commutating machine 2 is shown as ABF. Because, the speed of the wound rotor induction machine 1 is controlled by adjusting the current of the field winding 6, and the available output power of the first direct current commutating machine 2 is reduced at speed near synchronous speed of the wound rotor induction machine 1.

Figure 10:
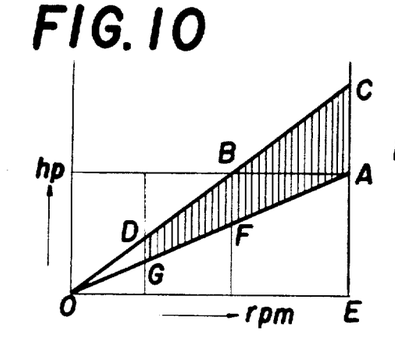
FIG. 10 represents speed-output characteristic of the arrangement shown in FIG. 1.

On the contrary, the characteristic curve CBD can be obtained by the arrangement of FIG. 1 including the motor-generator 3–5. When the current of the field winding 6 of the direct current commutating machine 2 is kept constant at its maximum rating current during controlling the wound rotor induction machine 1, the characteristic line CB can be obtained by controlling only the current of the field winding 7 of the second direct current commutating machine 3 which acts as a generator driven by the synchronous or asynchronous machine 5. In this case the machine 5 acts as a motor, and, the first direct current commutating machine 2 is supplied with a D.C. power from secondary output terminals 14 of the wound rotor induction machine 1 and terminals 10 and 11 of the second direct current commutating machine 3 through the rectifier 4.

When the current of the field winding 6 and 7 and the direction of the terminal voltage of the first and second direct current commutating machines 2 and 3 is so controlled that the machines 2 and 3 can absorb the electric power from the secondary winding of the wound rotor induction machine 1 through the rectifier 4, and the synchronous or asynchronous machine 5 is driven as a generator, the characteristic line BD in FIG. 10 can be obtained. Although it is well known, in general, that there are many methods of controlling or adjusting the current of the field winding 6 or 7, examples of these methods will be illustrated later in FIG. 3(a) and FIG. 3(b).

In this way, the wide range characteristic line CBD in FIG. 10 can be obtained by keeping the current of the field winding 6 of the first direct current commutating machine 2 at its maximum rating, and by controlling the direction and the magnitude of the current of the field winding 7 of the second direct current commutating machine 3 and thereby controlling the terminal voltage of the second direct current commutating machine 3 over the wide range from a positive voltage (the direct current commutating machine 3 acts as a generator) to a negative voltage (the direct current commutating machine 3 acts as a motor).

In this case, the available output power of the wound rotor induction machine 1 is shown by AFG line in FIG. 10, and the available output power of the first direct current commutating machine 2 is shown by the shade CBDGFA in FIG. 10.

As is understood from the above explanation, there are distinct difference between the arrangement of this invention and arrangements of prior methods of Kramer system or derived from Kramer system; and the arrangements of this invention has very much important advantages which can not be obtained by the arrangements of the prior methods as follows:

(a) In some of prior arrangements derived from Kramer system, there is another rotating machine than the auxiliary direct current machine whose rotor is mechanically coupled with the rotor of the main induction machine. However, the auixiliary direct current machine neither is supplied from the above rotating machine nor supply the rotating machine with electric power. In other words, electric power can not be transferred between the auxiliary direct current machine and the above rotating machine. Further, the above rotating machine is not a direct current commutating machine, therefore is connected electrically with not a direct current circuit but an alternating current circuit of a converter or a rectifier which is electrically connected with secondary terminals of the main induction machine.

In some of other prior arrangements for controlling induction machines by auxiliary machines, an auxiliary alternating current commutating machine is used, therefore, no converter is used in the secondary circuit of the main induction machine. However, generally, an A.C. commutator machine is unfavorable in commutation, construction, efficiency and for a wide range speed control. Further, an available output power of the A.C. commutating machine can not be used efficiently.

In another prior arrangement for controlling an induction machine by an auxiliary direct current machine and a converter, there is no combination of the auxiliary direct current machine and another direct current machine whose armature circuits are connected in series with each other through a direct current internal circuit of the converter. Therefore, the available output power of the auxiliary direct current machine cannot be utilized efficiently.

(b) On the contrary, in this invention, armature circuits of a first and a second direct current commutating machines are connected in series with each other through a direct current internal circuit of a converter whose alternating current terminals are connected electrically with secondary terminals of main induction machine. A rotor of the first direct current commutating machine is mechanically coupled with the wound rotor of the main induction machine; and a rotor of the second direct current commutating machine is machinically coupled to the rotor of another rotating machine than the said wound rotor type induction machine.

(c) Therefore, in this invention, the wound rotor induction machine can be controlled over a wide speed range while the total torque or output combined of the main induction machine with the auxiliary direct current commutating machine is being kept high by utilizing efficiently the available torque or output of the first auxiliary direct current commutating machine. The above advantage of this invention can be obtained owing to the arrangement by which the electric power can be transferred between the said first direct current commutating machine and the second direct current commutating machine, and cannot be obtained by arrangements of the prior methods explained above.

In the arrangement of FIG. 1 explained until now, both the wound rotor induction machine 1 and the direct current commutating machine 2 operate as motors. But, the wound rotor induction machine 1 can be controlled as a motor by controlling the direct current commutating machine 2 as a direct current generator. In this case, the direct current commutating machine 2 is so arranged that it may be driven by the wound rotor induction motor 1 by controlling the direction and the magnitude of the current of the field winding 6, and the direct current commutating machine 3 absorbs D.C. power from the secondary output terminals 14 of the wound rotor induction motor 1 and the direct current commutating machine 2 through the rectifier 4. The direct current commutating current 2 operates as a direct current generator when the direction of the current of the field winding 6 is controlled over the range opposite to the direction of the current of the field winding 6 in case the machine 2 operates as a motor. It is understood easily from the later explanation of FIG. 3 that the direction and the magnitude of the field winding 6 can be controlled smoothly.

Figure 11:
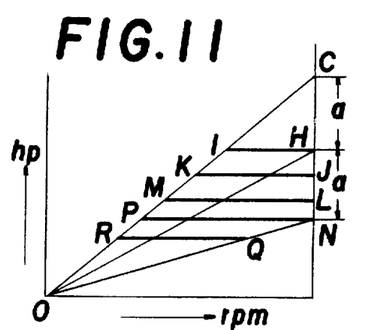
FIG. 11 repersents another speed-output characteristic of the arrangement shown in FIG. 1.

When the direction and the magnitude of the current of the field winding 6 are controlled and thereby the terminal voltage of the first direct current commutating machine 2 is controlled over the wide range from a positive voltage (the direct current commutating machine 2 operates as a generator) to a negative voltage (the direct current commutating machine 2 operates as a motor), the available total output power characteristics of the wound rotor induction machine 1 combined with the direct current commutating machine 2 are obtained over wide ranges, as HI, JK, LM, NP, RQ, etc. shown in FIG. 11, where $a$ is the output power of the direct current commutating machine 2. It will be understood by the later explanation of FIG. 3 how the direction and the magnitude of the current in the field winding 6 is controlled. When the primary winding of the wound rotor induction machine 1 is excited by the reverse phase alternating current or by a direct current in order to brake the induction machine, the wound rotor induction machine 1 can be controlled as a generator driven by its load or its rotary inertia through the operation of the direct current commutating machine 3 which absorbs the electric power from the secondary output terminals 14 of the wound rotor induction machine 1 and the direct current commutating machine 2. In this case, the reverse phase alternating current bus 11 to the primary winding of the induction machine 1 so that the direction of the rotation of the rotating filed made by the said reverse phase alternating current may be opposite to the direction of the rotation of the rotor of the induction machine.

Figure 2:
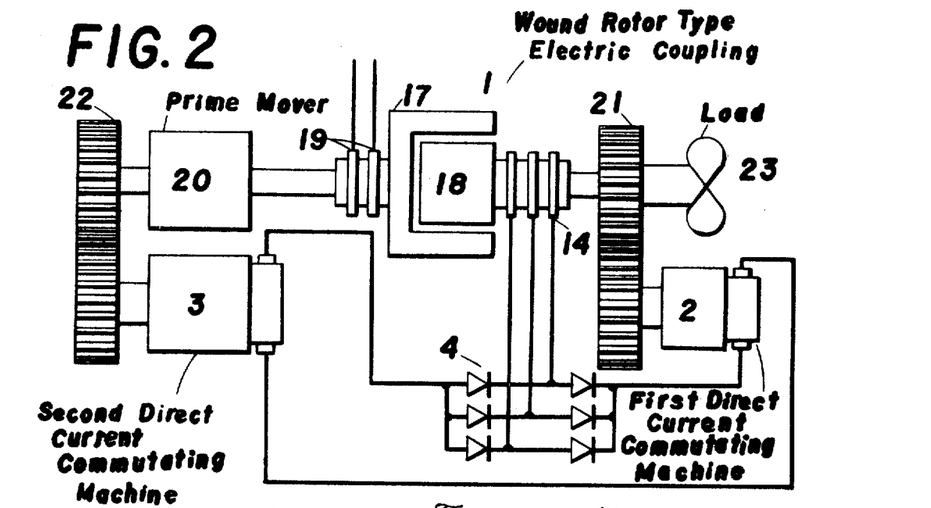
FIG. 2 illustrates diagrammatically another embodiment of my invention.

When an electric coupling is used as the wound rotor type induction machine, either the primary rotor or the secondary rotor is driven by the prime mover. In FIG. 2, the primary rotor 17 of the wound rotor type electric coupling 1 is driven by the prime mover 20, and is excited by a D.C. power through the terminals 19. The primary rotor 17 is wound by a direct current winding by which the stationary magnetic field can be produced with respect to the primary rotor 17. The secondary rotor 18 is wound by an alternating current winding in the same manner as of the wound rotor of an induction motor. Therefore if the primary rotor 17 excited by a direct current is driven by the primary mover 20, a rotating flux which interlinks with the winding of the secondary rotor 18 is produced, therefore an alternating current voltage is induced in the winding of the secondary rotor 18. When an alternating current flows in the winding of the secondary rotor 18, the force between the rotating flux and the alternating current in the winding of the secondary rotor 18, therefore the secondary rotor 18 also rotates in the same direction as of the rotation of the primary rotor 17. The terminals 14 of the secondary rotor 18 are connected to terminals or brushes of the first direct current commutating machine 2 and the second direct current commutating machine 3, through the rectifier 4.

In FIG. 2, the rotor of the second direct current commutating machine 3 is mechanically coupled to the rotating shaft of the prime mover 20 rotating machine or the primary rotor 17 through a gear 22. The rotor of the first direct current commutating machine 2 is mechanically coupled to the secondary rotor 18 of the wound rotor type electric coupling 1 through a gear 21. As the rotor of the second direct current commutating machine 3 is mechanically coupled to the rotating shaft of the prime mover 20, it is not necessary to install such a synchronous or an asynchronous machine 5 as shown in FIG. 1. Therefore, the arrangement becomes economical. Symbol 23 shows the load of the electric coupling.

In FIG. 2, the torque transmitted from the prime mover 20 to the load 23 can be controlled. Even if the speed of the prime mover 20 is approximately constant, the rotating speed of the load 23 can be controlled over a wide range by controlling the current of the field winding either of the second direct current commutating machine 3 or of the first direct current commutating machine 2.

Although the converter 4 in FIGS. 1 and 2 shows the rectifier, for instance, of semiconductor type, it has no need of mention that other static converters or rotary converters can be used in place of the rectifier 4. In FIG. 3, a rotary converter 24 is used. FIG. 3 shows examples of field exciting circuits of the direct current commutating machines.

It is preferable that the current of the field winding 6 or 7 can be smoothly controlled over a wide range from the maximum positive value to the maximum negative value by adjusting a single device, in order to control the direct current commutating machine 2 or 3 from the range where it operates as a generator to the range where it operates as a motor. In FIG. 3, the direction and the magnitude of the current of the field winding 6 can be controlled by adjusting only the variable resistor 28. The symbols 29 and 30 show resistors connected in series with each other to the field winding 6, and the symbols 25 and 26 show rectifiers. The symbol 27 shows the A.C. source for the field excitation. The magnitude and the direction of the current of the field winding 7 can also be controlled by adjusting only the variable transformer 32. The symbols 33 and 34 show rectifiers for the source of the field excitation, and the symbol 35 is a resistor. The rectifier 33 and the transformer 31 are connected in parallel with the rectifier 34 and the transformer 32 to the field winding 7.

Figure 3A:
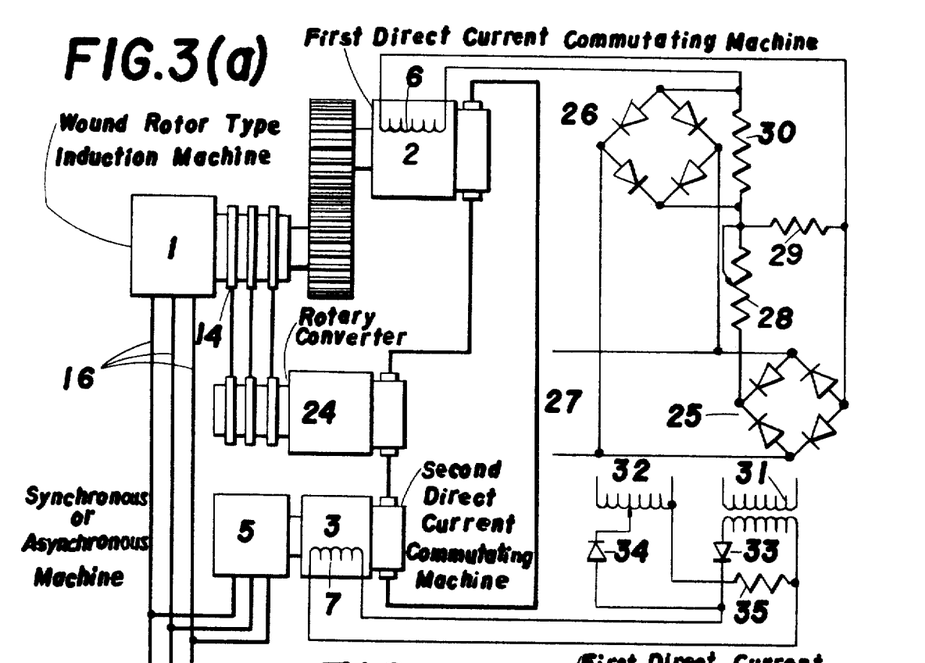
FIG. 3 illustrates diagrammatically still another embodiment of my invention.
Figures 3B, 4:
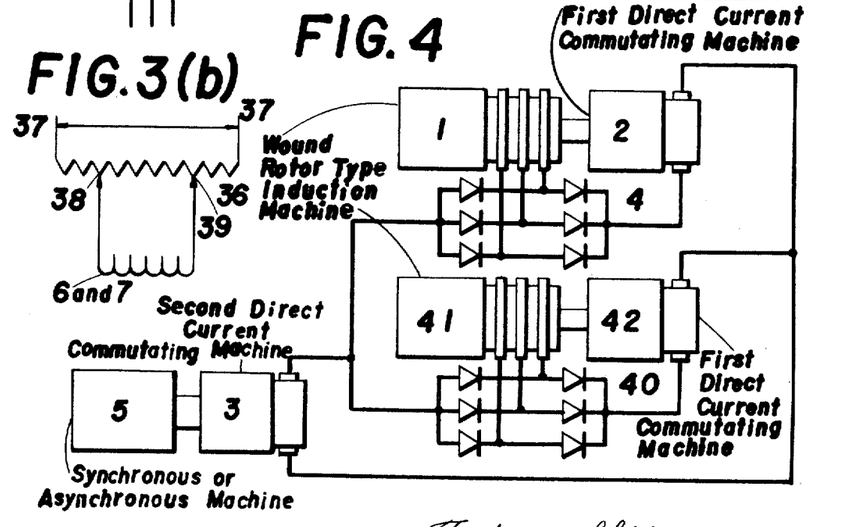
FIG. 4 shows a further embodiment of my invention.

The manner in which the adjustment of the current of the field winding 6 or 7 in this invention is illustrated by FIG. 3(a) and FIG. 3(b).

As is understood from FIG. 3(a), the voltage supplied on the terminals of the field winding 6 is approximately equal to the sum of the terminal voltage on the resistor 30 and the terminal voltage on the resistor 29. The direction of the terminal voltage on the resistor 30 is opposite to the direction of the terminal voltage on the resistor 29. When the variable resistor 28 is adjusted, the terminal voltage on the resistor 29 is controlled. If the resistance of the resistor 28 is adjusted to be large, the terminal voltage 29 becomes small, therefore the direction of the terminal voltage on the field winding 6 becomes the same as that of the terminal voltage of the resistor 30. Then, if the value of the the resistance of the resistor 28 is adjusted gradually to be smaller, the terminal voltage on or the current of the field winding 6 becomes gradually smaller, and when the terminal voltage of the resistor 30 becomes equal to that of the resistor 29, the terminal voltage on or the current of the field winding 6 becomes zero. if the value of the resistance of the resistor 28 is adjusted still to be further smaller, the direction of the terminal voltage supplied on the field winding 6 changes to the opposite direction, therefore the direction of the current of the field winding 6 also changes to the opposite direction. After that, if the value of the resistance of the resistor 28 is adjusted to be still further smaller, the curren of the field winding 6 becomes gradually to be larger. Thus, the direction and the magnitude of the current of the field winding 6 can be controlled by adjusting only the variable resistor 28.

The current of the field winding 7 is the sum of the current supplied from the voltage of the transformer 31 through the resistor 33 and the current supplied from the voltage of the transformer 32 through the resistor 34. The direction of the current of the field winding 7 supplied from the transformer 31 through the resistor 33 is opposite to that supplied from the variable transformer 32 through the rectifier 34. Therefore, when the tap of the variable transformer 32 is adjusted from a small number of winding turn to a large value, the direction of the current of the field winding 7 changes from the same direction as that of the rectifier 33 to the opposite direction, and the magnitude of the current of the field winding 7 also changes. In other words, when the tap of the variable transformer 32 is adjusted to be a small number of the winding turn, the direction of the current of the field winding 7 becomes the same as that of the rectifier 33. If the tap of the variable transformer 32 is adjusted gradually to be a larger number of winding turn, the magnitude of the current of the field winding 7 becomes gradually smaller, toward zero, and then if the tap of the variable transformer 32 is adjusted to further larger number of winding turn, the direction of the current of the field winding 7 changes to the same direction of the rectifier 34, that is; opposite to the direction of the rectifier 33. Then if the tap of the variable transformer 32 is adjusted to be a further larger number of winding turn, the current of the field winding 7 increases gradually.

Thus, it can be said that the direction and the magnitude of the current of the field winding 7 can be controlled by adjusting only the variable transformer 32.

FIG. 3(b), illustrating an example of a partial circuit for the field excitation shows that a potentiometer 36 is connected across a D.C. supply 37, the potentiometer having a fixed tapping 38 and a variable tapping 39 between which the field winding 6 or 7 is connected, in order to provide variable excitation current for the field winding 6 or 7. By movement of the tapping 39 between the two ends of the potentiometer the field excitation current to the winding 6 or 7 can be varied over a continuous range from a positive value to a negative value.

The direction and the magnitude of the current of the field winding 6 or 7 is decided according to the direction and the magnitude of the voltage between the fixed tapping 38 and the variable tapping 39. Therefore, if the tapping 39 moves from the right side range of the fixed tapping 38 to the left side range, the direction of the current of the field winding 6 or 7 changes. For instance, when the tapping 39 is connected with the right end of the potentiometer 36 and the current of the field winding 6 or 7 is positive maximum, the current becomes gradually smaller if the tapping 39 moves gradually toward the left side. When the tapping 39 moves across the fixed tapping 38, the direction of the current of the field winding 6 or 7 changes from a positive to a negative value. Then, if the tapping 39 moves further toward the left side, the current of the field winding 6 becomes a negative larger value.

Thus, it can be said that the direction and the magnitude of the field winding 6 or 7 can be controlled by moving only the variable tapping 39.

FIG. 4 shows that a plurality of wound rotor type induction machines can be used. In FIG. 4, the motor-generator 3–5 is used in common by the plurality of wound rotor type induction machines 1, 41, converters or retifiers 4, 40, and direct current commutating machines 2, 42. The D.C. circuit of the rectifier 4 and the armature circuit of the first direct current commutating machine 2 are connected in series with each other. The D.C. circuit of the rectifier 40 is also connected in series with the armature circuit of the first direct current commutating machine 42. The series circuit between the rectifier 4 and the first direct current commutating machine 2 is connected in parallel with the other series circuit between the other rectifier 40 and the other first direct current commutating machine 42, and is connected in series with the armature circuit of the second direct current commutating machine 3. When the current of the field winding of the second direct current commutating machine 3 is controlled, the plurality of the wound rotor induction machines 1 and 41 are simultaneously controlled. When the current of the field winding of the first direct current commutating machine 2 or 42 is controlled, the wound rotor induction machine 1 or 41 is controlled independently of each other. The reason is understood from the following. The counter E.M.F. on the secondary terminals of the induction machine 1 is decided by the total of the terminal voltage of the first direct current commutating machine 2 and the terminal voltage of the second direct current commutating macthine 3; and the speed of the induction machine 1 is controlled by controlling the counter E.M.F. on the secondary terminals; therefore, if only the terminal voltage of the first direct current commutating machine 2 is controlled by controlling the current of the field winding of the first direct current commutating machine 2, only the counter E.M.F. of the secondary terminals of the induction machine 1 can be controlled and only the speed of the induction machine 1 can be controlled while the speed of the induction machine 41 is kept constant. In that case, the terminal voltage of the direct current commutating machine 42 and the terminal voltage of the second direct current commutating machine are kept constant. Therefore, the secondary terminal voltage of the induction machine 41 is kept constant, and the speed of the induction machine 41 can be kept constant.

In the similar manner, if only the terminal voltage of the first direct current commutating machine 42 is controlled by controlling the current of the field winding of the first direct current commutating machine 42, only the speed of the induction machine 4 can be controlled while the speed of the induction machine 1 is kept constant.

Thus, it can be said that the wound rotor induction machine 1 or 41 can be controlled independently of each other when the current of the field winding of the first direct current commutating machine 2 or 42 is controlled.

In FIG. 4, the current of the field windings both or either of the first direct current commutating machines 2, 42, and/or of the second direct current commutating machine 3 can be controlled, and thereby the terminal voltage of these direct current commutating machines can be controlled over continuous ranges from positive values to negative values.

The manner how the terminal voltage of these direct current commutating machines 2, 42 and/or 3 is controlled by controlling the field windings of these direct current commutating machines 2, 42, and/or 3 is similar as shown in FIG. 3 explained before. As is explained before, the speed of the induction machines 1 and 2 respectively are controlled by the counter E.M.F. of the secondary terminal voltage of each induction machine 1 or 2.

Figures 5, 6:
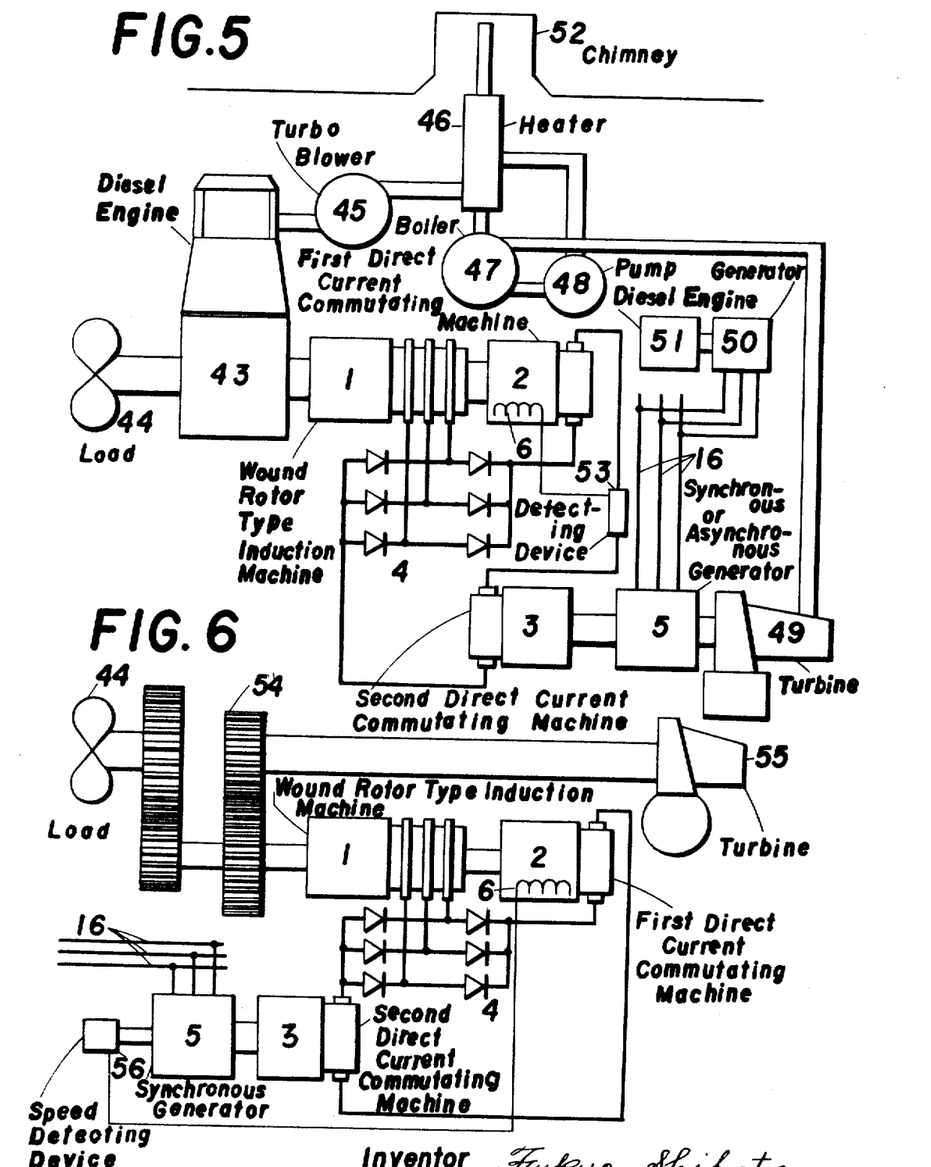
FIG. 5, FIG. 6, FIG. 7, FIG. 8 and FIG. 9 show still further embodiments of my invention.

FIG. 5 shows an example of application of this invention. Exhaust gas produced in a diesel engine 43 having a load 44 passes through a turbo-blower 45 and a heater 46, to a chimney 52, and thereby water in a boiler 47 is changed into steam. Symbol 48 shows a pump. A turbine 49 driven by the steam of the boiler 47.

In FIG. 5, rotors of the wound rotor type induction machine 1 and of the first direct current commutating machine 2 are mechanically coupled to the rotating shaft of the diesel engine 43. Rotors of the second direct current commutating machine 3 and of the synchronous or asynchronous generator 5 are mechanically coupled to the rotating shaft of the turbine 49. The symbol 50 shows another generator driven by a diesel engine 51. In FIG. 5, the machine 5 is a generator and supplies the auxiliary machines of the diesel engine 43 with the electric power. The generator 5 is driven by the turbine 49 and the second direct current commutating machine 3 which is supplied from the secondary output terminals of the wound rotor induction machine and the first direct current commutating machine 2 through the rectifier 4 with electric power.

The primary winding of the wound rotor induction machine 1 is excited by a D.C. power or a reverse phase A.C. power. The symbol 53 shows a detecting device by which the current between the first and the second direct current commutating machine 2 and 3 can be detected. The current of the field winding 6 is controlled by the current of the detecting device 53. The electric power fed from the first direct current commutating machine 2 to the second direct current commutating machine 3 can be controlled by adjusting the current of the field winding 6 which is controlled by the current of the detecting device 53. The setting point of the detecting device 53 can be controlled automatically or manually.

Thus, the shortage of the electric power of the generator 5 given from the rotating shaft of the turbine 49 to the generator load can be supplemented by the power of the diesel engine 43.

FIG. 6 shows a turbine 55 driving not only the load 44 but also the wound rotor type induction machine 1 through gears 54. The first direct current commutating machine 2 is also driven by the turbine 55 which may be one of the other prime movers. The synchronous machine 5 is here a synchronous generator driven by the second direct current commutating machine 3 and supplies auxiliary machines with electric power through the A.C. bus 16. The speed of the generator 5 can be kept constant at a value by controlling the current of the field winding 6 or 7 through the operation of the revolution detecting device 56, for instance tachometer generator, even if the revolution of the wound rotor induction machine 1 changes over a certain range.

Figures 7A, 7B:
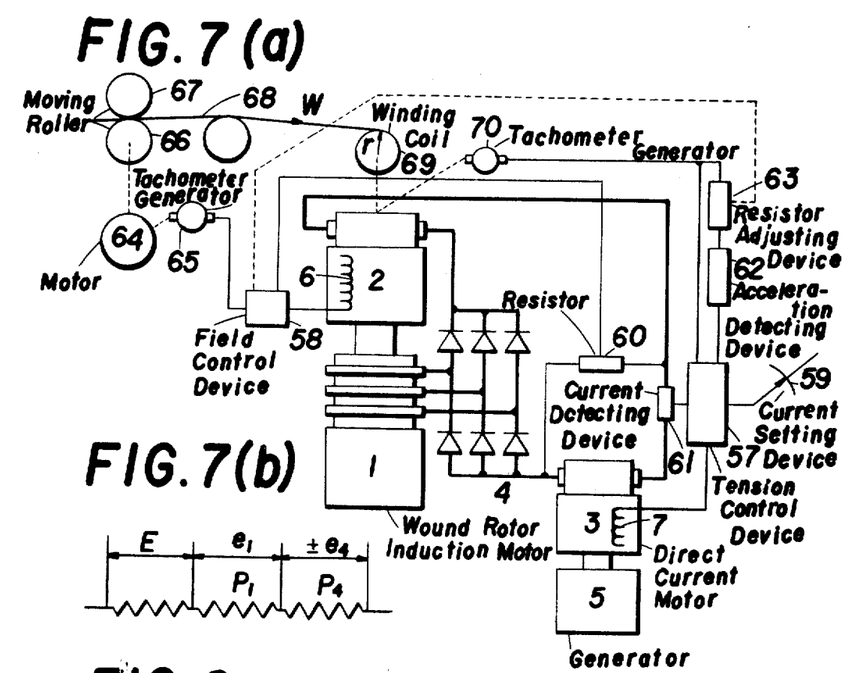

FIG. 7(a) shows an example of a circuit diagram of application of this invention. In order to keep the winding speed of the winding machine constant, it is necessary to reduce the revolution speed of the winding motor in inverse proportion to the diameter of the winding coil, because the winding coil diameter becomes large as the winding goes. In this case, it is required that the winding tension of the material 68 is kept constant regardless of the speed of the winding motor. A winding coil 69 which winds a material 68 is driven by the wound rotor induction motor 1 mechanically coupled to the direct current motor 2.

Supposing that W is winding tension, $r$ winding coil diameter, and $w$ is revolution per minute of winding coil, the circumference speed of the winding coil is $2\pi r \times w$. Therefore, winding tension $\times$ material speed $= k_1 W \times 2\pi r \times w = k \times W \times r \times w = k \times \tau \times w = k \times$ output power of winding motor, where $\tau$ is torque, and $k_1$, $k$ are constants.

In FIG. 7(a), tension control device 57 has an action by which the current of the field winding 7 can be controlled directly or indirectly through comparing the detecting current of the detecting device 61 with the standard value in the setting device 5. The above "indirectly" means that the current of the field winding can be controlled by using the other device than the tension control device 57, for instance, by using an exciter.

When the diameter $r$ of the winding coil 69 increases, and the current of the direct current motor 2 increases, the tension control device 57 opeartes to reduce the terminal voltage of the direct current machine 3, to keep the current constant at a standard value. So, the voltage balance is lost between the voltage of the direct current motor 3 and the voltage of the tachometer-generator 65 measuring the revolution of the motor 64 which moves the material 68, on account of slow response of field control device 58. The terminal voltage of the direct current machine 3 is detected by the resistor 60, and the detected voltage of the resistor 60 is compared with the voltage of the tachometer generator 65 in the field control device 58. Then the field control device 58 operates to balance the terminal voltage of the direct current machine 3 and the voltage of the tachometer-generator 65 by increasing or decreasing the current of the field winding 6 of the direct current machine 2.

An acceleration detecting device 62 makes the tension control device 57 operate to increase the acceleration up to the normal speed of the wound rotor induction motor 1. A resistor of the adjusting device 63 connected in series with the acceleration detecting device 62 is controlled by the field control device 58. It is also shown that the tachometer-generator 70 mechanically coupled to the winding motor 2 makes the tension control device 57 operate to compensate the mechanical loss of the winding motors 1 and 2.

The output power P of the winding motors composed of the wound rotor induction motor 1 and the direct current motor 2 is as follows:

$$P = P_3 + P_5 \quad (1)$$

where, $P_3$ is approximately equal to mechanical output power of wound rotor induction motor 1, and $P_5$ is approximately equal to mechanical output power of direct current motor 2.

On the other hand, we can get $$P_1:P_2:P_3 = 1:s:(1-s) \quad (2)$$

where $P_1$ is input power into secondary winding, $P_2$ is approximately equal to electrical output power from the secondary output terminals, and $s$ is slip of wound rotor induction motor.

Supposing the power transferred between the direct current motors 3 and 2 is $P_4$.

$$P_2 = \pm P_4 - P_5 \quad (3)$$

From Equations 1, 2, 3, $$P = P_3 + P_5 = P_1 - P_2 + P_2 \pm P_4 = P_1 \pm P_4 \quad (4)$$

This equation shows that P is kept constant if the current of the direct current motor 2 is constant, so long as the terminal voltages of the wound rotor induction motor 1 and the direct current motor 2 are kept constant. Therefore, the automatic control system of constant tension can be obtained, if the current of the direct current motor 2 is kept constant, so long as the terminal voltage of the direct current motor 3 is kept constant.

In FIG. 7(b) is shown one example of comparing devices in the field control device 58 in which the terminal voltage of the direct current motor 3 detected by the resistor 60 is compared with the voltage of the tachometer-generator 65.

The value E which is proportionate to the voltage of the tachometer-generator 65 is taken on a resistor, the value $e_1$ which is corresponding to the input power $P_1$ into the primary winding of the wound rotor induction motor is taken on another resistor, and the value $e_4$ which is corresponding to the output or input power $P_4$ of the direct current motor 3. E is compared with $e_1 \pm e_4$ by connecting the resistor showing E, $e_1$ and $\pm e_4$ in series with one another. In this case, if the revolution of the moving rotor 64 is manually raised up, the value E is varied, and $e_4$ is automatically varied corresponding to this variation of E. After all, the variation of $e_1 \pm e_4$ is proportionate to the variation of E.

Namely, as the output power $P_3 + P_5 = P_1 \pm P_4$ of the winding motors 1 and 2 can be varied in proportion to the moving of the material, the tension can be kept constant by keeping the current of the direct current motor 2 constant regardless of the revolution of the moving motor 64.

In FIG. 7(a) symbols 66 and 67 show moving rollers.

Figure 8:
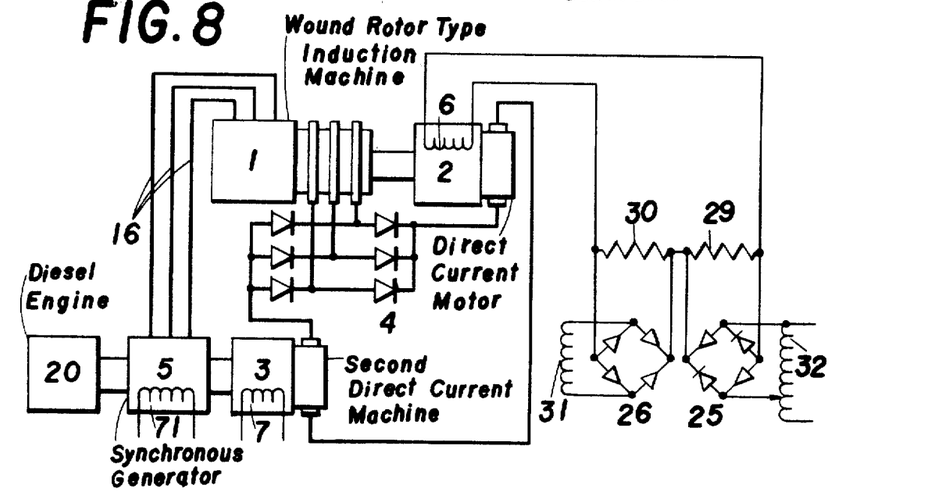

FIG. 8 shows that the rotors of the second direct current machine 3 and the machine 5, again a synchronous generator are mechanically coupled to the rotating shaft of the prime mover, for instance of the diesel engine 20. The speed of the wound rotor induction motor can be controlled by adjusting the current of the field winding 7 or 6 or adjusting the current of the field winding 71 of the generator 5. The current of the field winding 6 and the terminal voltage of the direct current motor 2 can be controlled over a continuous range from a positive to a negative value by movement of the tapping of the variable transformer 32. Of course, a magnetic amplifier or other adjustable device can be substituted for the variable transformer 32.

Figure 9:
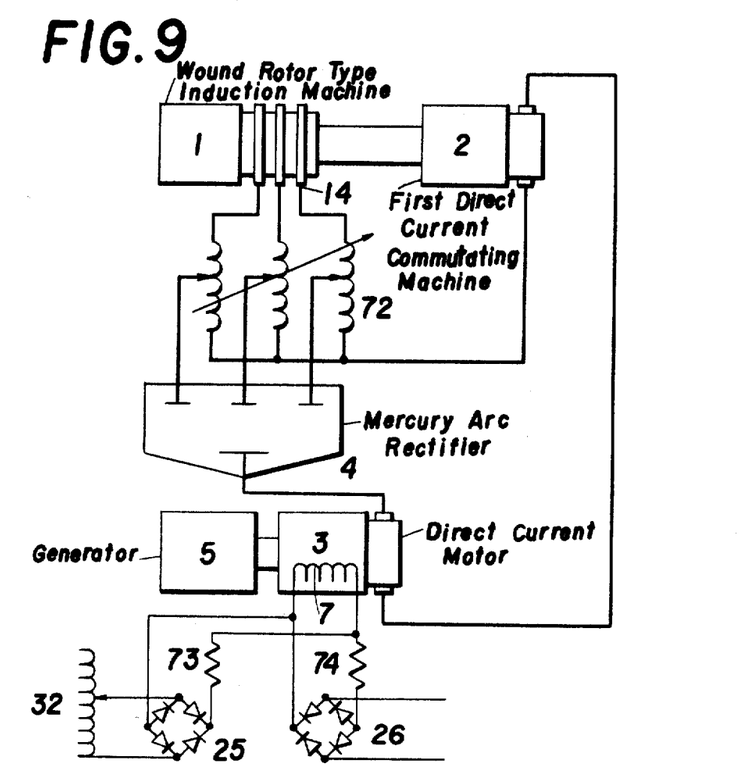

In FIG. 9, a mercury arc rectifier 4 is used as a converter. A variable ratio transformer 72 is inserted between the secondary output terminals of the wound rotor induction machine 1 and the converter 4, in order to convert the voltage and the current at the secondary output terminal 14 by some ratio. The current of the field winding 7 and the terminal voltage of the direct current motor 3 can be controlled over a continuous range from a positive value to a negative value by movement of the tapping of the variable transformer 32. Symbols 73 and 74 are resistors. Even if the symbol 72 is not a variable ratio transformer but only a transformer, there is an effect of operation matching the voltage of the secondary winding of the wound rotor induction machine with that of the terminal voltage of the direct current commutating machines.

Having thus fully described my invention, what I claim as new, and desire to secure by Letters Patent, is:

1. An electric control system for a wound rotor type induction machine having secondary output terminals in an arrangement which comprises in combination: a first direct current commutating machine which has an armature circuit, a commutator and a field winding and which has also a rotor mechanically coupled to the wound rotor of the said induction machine; a second direct current commutating machine which has a rotor, an armature circuit, a commutator and a field winding; a converter which has direct current terminals and through which the secondary output terminals of the said induction machine are connected to the said commutators of the first and the second direct current commutating machines; a rotating machine which is other than the said induction machine and which has a rotor mechanically coupled to the said rotor of the second direct current commutating machine; control circuit and means of field excitation of the first and the second direct current commutating machine; and electric connections between the said converter and the first and the second direct current commutating machines whose armature circuits are connected electrically in series with each other to the said direct current terminals of the said converter so that electric power can be transferred between the said first direct current commutating machine and the second direct current commutating machine.

2. An electric control system for a wound rotor type induction machine having secondary output terminals in an arrangement which comprises in combination: a first direct current commutating machine which has an armature circuit, a commutator and a field winding and which has also a rotor mechanically coupled to the wound rotor of the said induction machine; a second direct current commutating machine which has a rotor, an armature circuit, a commutator and a field winding; a converter which has direct current terminals and through which the secondary output terminals of the said induction machine are connected to the said commutators of the first and the second direct current commutating machine; control circuit and means of field excitation of the first and the second direct current commutating machine; and electric connections between the said converter and the first and the second direct current commutating machines whose armature circuits are connected electrically in series with each other to the said direct current terminals of the converter so that electric power can be transferred between the said first direct current commutating machine and the second direct current commutating machine wherein the terminal voltage of the second direct current commutating machine is controlled over a wide range from a positive value to a negative value by controlling the field excitation of the second direct current commutating machine from a positive value to a negative value.

3. An electric control system for a wound rotor type induction machine having secondary output terminals in an arrangement which comprises in combination: a first direct current commutating machine which has an armature circuit, a commutator and a field winding and which has also a rotor mechanically coupled to the wound rotor of the said induction machine; a second direct current commutating machine which has a rotor, an armature circuit, a commutator and a field winding; a converter which has direct current terminals and through which the secondary output terminals of the said induction machine are connected to the said commutators of the first and the second direct current commutating machines; a rotating machine which is other than the said induction machine and which has a rotor mechanically coupled to the said rotor of the second direct current commutating machine; control circuit and means of field excitation of the first and the second direct current commutating machine; and electric connections between the said converter and the first and the second direct current commutating machines whose armature circuits are connected electrically in series with each other to the said direct current terminals of the converter so that electric power can be transferred between the said first direct current commutating machine and the second direct current commutating machine wherein the terminal voltage of the first direct current commutating machine is controlled over a wide range from a positive value to a negative value by controlling the field excitation of the first direct current commutating machine from a positive value to a negative value.

4. A speed control system for a wound rotor type electric machine having secondary output terminals in an arrangement which comprises in combination; a first direct current commutating machine which has an armature circuit, a commutator and a field winding and which has also a rotor mechanically coupled to the wound rotor of the said electric coupling; a second direct current commutating machine which has a rotor, an armature circuit, a commutator and a field winding; a converter which has direct current terminals and through which the secondary output terminals of the said electric coupling are connected to the said commutators of the first and the second direct current commutating machines; a rotating machine which is other than the said induction machine and which has a rotor mechanically coupled to the said rotor of the second direct current commutating machine; control circuit and means of field excitation of the first and the second direct current commutating machine; and electric connections between the said converter and the first and the second direct current commutating machines whose armature circuits are connected electrically in series with each other to the said direct current internal circuit of the converter so that electric power can be transferred between the said first direct current commutating machine and the second direct current commutating machine.

5. A speed control system for a wound rotor type electric coupling having secondary output terminals in an arrangement which comprises in combination; a first direct current commutating machine which has an armature circuit, commutator and a field winding and which has also a rotor mechanically coupled to the wound rotor of the said electric coupling; a second direct current commutating machine which has a rotor, an armature circuit, a commutator and a field winding; a converter which has direct current terminals and through which the secondary output terminals of the said electric coupling are connected to the said commutators of the first and the second direct current commutating machines; a prime mover which has a rotating shaft mechanically coupled to the said rotor of the second direct current commutating machine; control circuit and means of field excitation of the first and the second direct current commutating machine; and electric connections between the said converter and the first and the second direct current commutating machines whose armature circuits are connected electrically in series with each other through to the said direct current internal circuit of the converter so that electric power can be transferred between the said first direct current commutating machine and the second direct current commutating machine.

6. An electric control system for a wound rotor type induction machine having secondary output terminals and the second direct current commutating machine in an arrangement which comprises in combination; a first direct current commutating machine which has an armature circuit, a commutator and a field winding and which has also a rotor mechanically coupled to the wound rotor of the said induction machine; a second direct current commutating machine which has a rotor, an armature circuit, a commutator and a field winding; a converter which has direct current terminals and through which the secondary output terminals of the said induction machine are connected to the said commutators of the first and the second direct current commutating machines; a synchronous or an asynchronous alternating current machine which is other than the said induction machine and which has a rotor mechanically coupled to the said rotor of the second direct current commutating machine; control circuit and means of field excitation of the first and the second direct current commutating machine; and electric connections between the said converter and the first and the second direct current commutating machines whose armature circuits are connected electrically in series with each other to the said direct current internal circuit of the converter so that electric power can be transferred between the said first direct current commutating machine and the second direct current commutating machine.

7. An electric control system for a wound rotor type induction machine having secondary output terminals in an arrangement which comprises in combination; a first direct current commutating machine which has an armature circuit, a commutator and a field winding and which has also a rotor mechanically coupled to the wound rotor of the said induction machine; a second direct current commutating machine which has a rotor, an armature circuit, a commutator and a field winding; a converter which is composed of semiconductor rectifiers and has direct current terminals and through which the secondary output terminals of the said induction machine are connected to the said commutators of the first and the second direct current commutating machine; a rotating machine which is other than the said induction machine and which has a rotor mechanically coupled to the said rotor of the second direct current commutating machine; control circuit and means of field excitation of the first and the second direct current commutating machine; and to the rotor of another rotating machine than the said wound rotor type and electric connections between the said converter and the first and the second direct current commutating machines whose armature circuits are connected electrically in series with each other to the said direct current terminals of the converter so that electric power can be transferred between the said first direct current commutating machine and the second direct current commutating machine.

8. An electric control system for a wound rotor type induction machine having secondary output terminals in an arrangement which comprises in combination; a first direct current commutating machine which has an armature circuit, a commutator and a field winding and which has also a rotor mechanically coupled to the wound rotor of the said induction machine; a second direct current commutating machine which has a rotor, an armature circuit, a commutator and a field winding; a converter which has direct current terminals and through which the secondary output terminals of the said induction machine are connected to the said commutators of the first and the second direct current commutating machines; a synchronous or an asynchronous alternating current machine which is other than the said induction machine and which has a rotor mechanically coupled to the said rotor of the second direct current commutating machine; control circuit and means of field excitation of the first and the second direct current commutating machine; and electric connections between the said converter and the first and the second direct current commutating machines whose armature circuits are connected electrically in series with each other through to the said direct current terminals of the converter so that electric power can be transferred between the said first direct current commutating machine and the second direct current commutating machine; wherein the second direct current commutating machine is connected in common through a plurality of converters to a plurality of wound rotor type induction machines each of which is mechanically coupled to the respective first direct current commutating machine, and wherein the series circuit between a converter and a first direct current commutating machine are connected in parallel with the series circuit between another converter and another first direct current commutating machine and are connected in series with the armature circuit of the second direct current commutating machine.

9. An electric control system for a wound rotor type induction machine having secondary output terminals in an arrangement which comprises in combination; a first direct current commutating machine of which a terminal for an armature circuit is electrically connected to secondary output terminals of the said induction machine through a converter and whose rotor is mechanically coupled to the wound rotor of the said induction machine; a second direct current commutating machine which has a rotor, an armature circuit, a commutator and a field winding; a converter which has direct current terminals and through which the secondary output terminals of the said induction machine are connected to the said commutators of the first and the second direct current commutating machines; a synchronous or an asynchronous alternating current machine which is other than the said induction machine and which has a rotor mechanically coupled to the said rotor of the second direct current commutating machine; control circuit and means of field excitation of the first and the second direct current commutating machine; and electric connections between the said converter and the first and the second direct current commutating machines whose armature circuits are connected electrically in series with each other to the said direct current terminals of the converter so that electric power can be transferred between the said first direct current commutating machine and the second direct current commutating machine; wherein a winding coil which winds a material is driven by the wound rotor induction machine, and wherein is installed a field control device which can increase or decrease the current of the field winding of the first direct current machine by the operation of a signal compared between the terminal voltage of the second direct current machine and the voltage of a tachometer-generator measuring the speed of the motor which moves the material.

10. An electric control system for a wound rotor type induction machine having secondary output terminals in an arrangement which comprises in combination; a first direct current commutating machine which has an armature circuit, a commutator and a field winding and which has also a rotor mechanically coupled to the wound rotor of the said induction machine; a second direct current commutating machine which has a rotor, an armature circuit, a commutator and a field winding; a converter which has direct current terminals and through which the secondary output terminals of the said induction machine are connected to the said commutators of the first and the second direct current commutating machines; a prime mover which has a rotating shaft mechanically coupled to the said rotor of the second direct current commutating machine; control circuit and means of field excitation of the first and the second direct current commutating machine; and electric connections between the said converter and current commutating machines whose armature circuits are connected electrically in series with each other to the said direct current terminals of the converter so that electric power can be transferred between the said first direct current commutating machine and the second direct current commutating machine.

References Cited

UNITED STATES PATENTS

| 1,637,886 | 8/1927 | Weiler | 318—197 |
| 1,863,065 | 6/1932 | Ossanna | 318—197 |
| 1,967,107 | 7/1934 | Thurston | 318—197 |
| 2,201,006 | 5/1940 | Kilgore | 318—197 |
| 2,333,538 | 11/1943 | Liwschitz | 318—197 |
| 2,836,779 | 5/1958 | Summers | 318—197 |
| 3,250,974 | 5/1966 | Wallace | 318—197 |

ORIS L. RADER, *Primary Examiner.*

G. Z. RUBINSON, *Assistant Examiner.*